United States Patent [19]

Nose et al.

[11] Patent Number: 4,825,756
[45] Date of Patent: May 2, 1989

[54] CONTROLLER FOR AIR CONDITIONER SYSTEM FOR AUTOMOTIVE VEHICLE

[75] Inventors: Toshimitsu Nose; Toshio Ohashi; Koichi Doi, all of Atsugi, Japan

[73] Assignee: Nissan Motor Company, Limited, Yokohama, Japan

[21] Appl. No.: 221,795

[22] Filed: Jul. 20, 1988

[30] Foreign Application Priority Data

Jul. 22, 1987 [JP] Japan .............................. 62-111318[U]

[51] Int. Cl.⁴ .............................................. B60H 1/00
[52] U.S. Cl. .......................................... 98/2; 165/25; 165/42
[58] Field of Search .................. 98/2, 2.05, 2.08, 2.11; 165/25, 42, 43

[56] References Cited

U.S. PATENT DOCUMENTS

| | | | |
|---|---|---|---|
| 3,191,669 | 6/1965 | Johnson et al. | 165/25 |
| 3,421,576 | 1/1969 | Roane | 165/42 X |
| 3,587,439 | 6/1971 | Mercier | 98/2 |
| 3,845,700 | 11/1974 | Lefeuvea | 98/2 |
| 4,355,752 | 10/1982 | Antorne | 165/43 X |
| 4,656,926 | 4/1987 | Bauer et al. | 98/2 |
| 4,762,169 | 8/1988 | Andersen et al. | 165/25 |

Primary Examiner—William E. Tapolcai
Attorney, Agent, or Firm—Foley & Lardner, Schwartz, Jeffery, Schwaab, Mack, Blumenthal & Evans

[57] ABSTRACT

A controller for automotive air conditioner system includes first and second control units which are cooperable for controlling the condition of air supplied to the vehicular cabin. The first control unit has side edges, each of which engages the channel between horizontally extending rails formed on the inner surface of the side wall of the controller body. The first control unit can disengage from the channel to be detachable from the controller body so as to allow another control unit having edges of the same shape as those of the first control unit to be substituted for the first control unit.

7 Claims, 3 Drawing Sheets

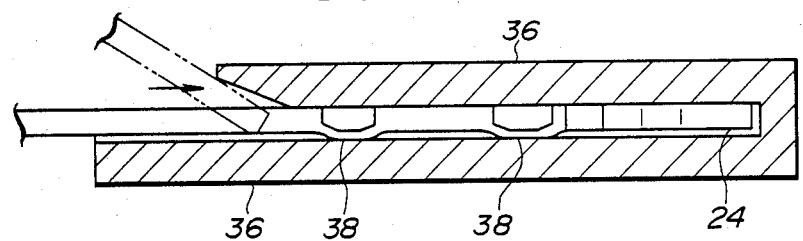
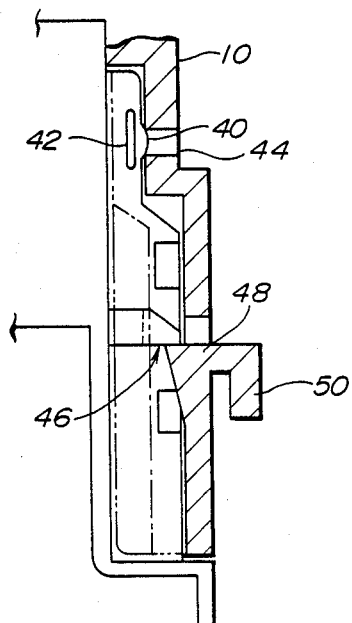
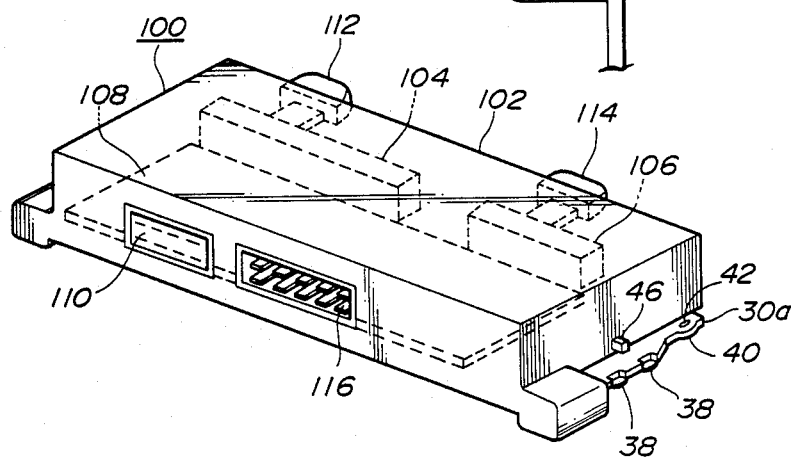

CONTROLLER FOR AIR CONDITIONER SYSTEM FOR AUTOMOTIVE VEHICLE

BACKGROUND OF THE INVENTION

1. Field of the Invention

The present invention relates generally to a controller for controlling an air conditioner system for automotive vehicles. More specifically, the invention relates to a controller which has manually operable push button switches and sliding switches.

2. Description of the Prior Art

Automotive air conditioners have a controller for adjusting the condition of air supplied to the vehicular cabin. The controllers generally include manually operable switches, such as nozzle selecting switches for selecting one of VENT, BI-LEVEL, HEAT and defroster (DEF) and so forth, an intake door switch for adjusting an intake door to allow the air conditioner system to operate either in a fresh mode in which outside air is introduced into the vehicular cabin, or in a recirculation mode in which the air within the vehicular cabin is recirculated, an air conditioner switch for allowing the air conditioner system to operate in the air conditioning mode, a blower switch for changing the blower speed to adjust the amount of conditioning air discharged from discharge nozzles, and a temperature setting switch for controlling the opening angle of an air-mix door to adjust the temperature of conditioning air discharged from the discharge nozzles. Some controllers of this type have a plurality of push button switches serving as the nozzle selecting switches, the intake door switch and the air conditioning switch, and sliding switches serving as the blower switch and the temperature setting switch.

In the case of conventional controllers, if the user wishes to substitute high-performance sliding switches for the set sliding switches, entire controller must be changed, and this is expensive.

SUMMARY OF THE INVENTION

It is therefore a principal object to provide a controller which has two control units, one of which may be easily detached from the controller body, and exchanged for another control unit.

In order to accomplish the aforementioned object and specific objects, a controller includes two control units, one of which has an engaging portion which engages another engaging portion formed on the controller body to fix the control unit to the controller body and allows the unit to be detached from the body.

According to one aspect of the present invention, the controller for air conditioner system for automotive vehicles comprises:

a controller body having a first engaging portion on the inner wall thereof; and first and second control units housed in the controller body, the first and second control units cooperative for controlling the condition of air supplied to the vehicular cabin, the first control unit having a second engaging portion which engages the first engaging portion of the controller body to fix the first control unit to the inner wall of the controller body and which disengages from the first engaging portion of the controller body so as to allow the first control unit to be substituted for a third control unit having an engaging portion of the same shape as that of the second engaging portion, the third control unit being cooperative with the second control unit for controlling the condition of air supplied to the vehicular cabin.

The first engaging portion may comprise a pair of horizontally extending and inwardly projecting parallel rails formed on the inner surface of the side wall of the controller body, and the second engaging portion may be slidingly inserted into a channel formed between the rails to be supported on the rails. The second engaging portion may have a vertically projecting portion which abuts the inner wall of the channel to prevent the vertical vibrations of the first control unit. The second engaging portion may have an outwardly projecting portion and an elongated opening which is formed inside the projecting portion, and the projecting portion may engage an opening formed in the side wall of the controller body to prevent lateral vibrations of the first control unit when the second engaging portion engages the channel. The second engaging portion may have a vertically extending anchor, the upper end of which extends outwardly and which is esentially L-shaped in cross section, so that the free end of the anchor engages a latch formed on the inner surface of the side wall of the controller body to prevent the first control unit from releasing from the rail of said controller body, and is disengageable from the latch by pulling the latch in an outward direction. The first control unit may include manually operable sliding switches, and the second control unit may include manually operable push button switches. The sliding switches may include a blower switch for changing the blower speed to adjust the amount of conditioning air discharged from discharge nozzles, and a temperature setting switch for controlling the opening angle of an air-mix door to adjust the temperature of conditioning air discharged from the discharge nozzles, and the push button switches may include a nozzle selecting switch for selecting conditioning air discharge nozzles, an intake door switch for adjusting an intake door and an air conditioner switch.

BRIEF DESCRIPTION OF THE DRAWINGS

FIG. 5 is a fragmentary sectional view of a sliding rail formed on the side wall of the controller body taken along the line V—V of FIG. 2, which illustrates a method for inserting the detachable control unit into the channel of the sliding rail;

FIG. 6 is a fragmentary sectional view of the controller taken along the line VI—VI of FIG. 2, which illustrates the engagement of the detachable control unit with the controller body; and FIG. 7 is a perspective view of another sliding unit which is substituted for the sliding unit of FIG. 3, according to the present invention.

DESCRIPTION OF THE PREFERRED EMBODIMENT

Figure 1:
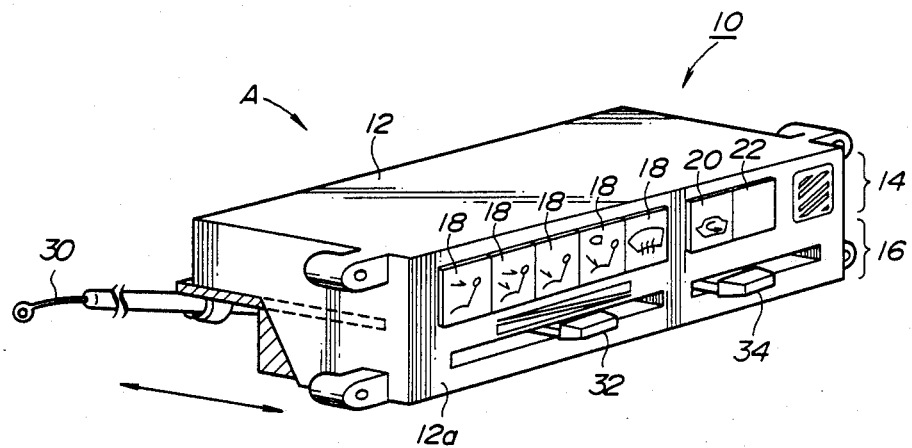
FIG. 1 is a perspective view of a controller according to the present invention.
Figure 3:
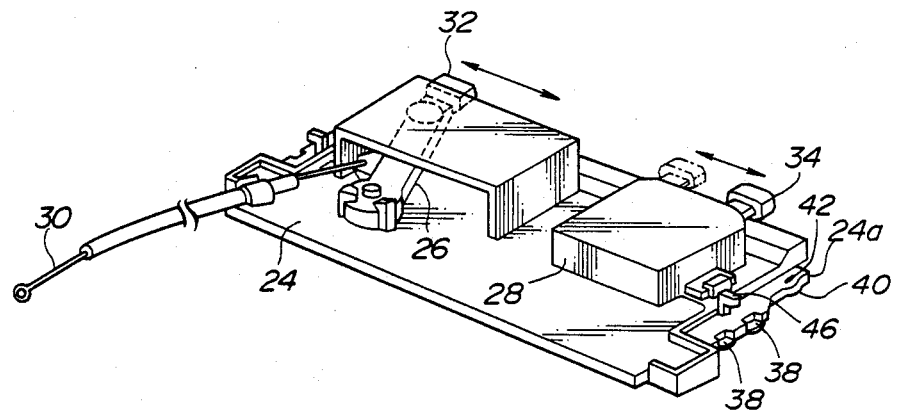
FIG. 3 is a perspective view of the detachable control unit of the controller viewed from the bottom thereof.
Figure 4:
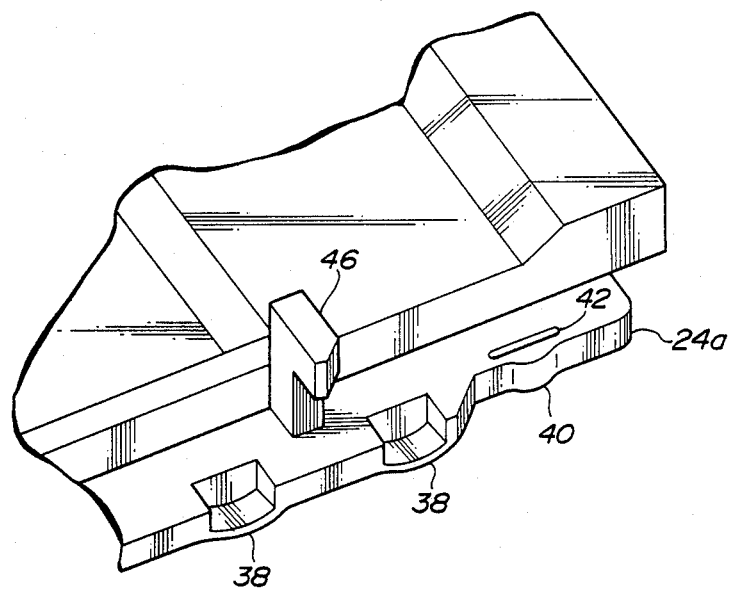
FIG. 4 is a fragmentary enlarged view of the detachable control unit of FIG. 3.

Referring now to the drawings, particularly to FIG. 1, a controller 10 for controlling an air conditioner system for automotive vehicles comprises a controller body 12 and control units 14 and 16. The control unit 14 has manually operable push button switches 18, 20 and 22 projecting from the front panel 12a of the controller body 12. The push button switches 18 serve as nozzle selecting switches for selecting conditioning air discharge nozzles. By operating the push button switches 18, the air conditioner system can operate in VENT, BI-LEVEL, HEAT and defroster (DEF) modes. The push button switch 20 serves as an intake door switch for adjusting an intake door. By operating the intake door switch 18, the air conditioner system can operate either in a fresh air mode, in which outside air is introduced into the vehicular cabin, or in a recirculation mode, in which the air within the vehicular cabin is recirculated. The push button switch 20 serves as an air conditioner switch. In response to turning on of the air conditioner switch 22, the air conditioner system can operate in the air conditioning mode. As shown in FIG. 3, the control unit 16 comprises a supporting plate 24, on which a rotatable lever 26 and a blower switch body 28 are supported. The rotatable lever 26 is connected to an air mix door not shown via a cable 30 and serves as a temperature setting switch for controlling the opening angle of the air-mix door to adjust the temperature of conditioning air discharged from discharge nozzles. The free end of the rotatable lever 26 is connected to a manually operable sliding member 32 which is slidable along a laterally extending opening formed in the front panel 12a of the controller body 12. The blower switch body 28 houses a blower switch for changing the blower speed to adjust the amount of conditioning air discharged from the discharge nozzles. The blower switch housed in the blower switch body 28 is connected to a manually operable sliding member 34 which is also slidable along a laterally extending opening formed in the front panel 12a of the controller body 12.

Figure 2:
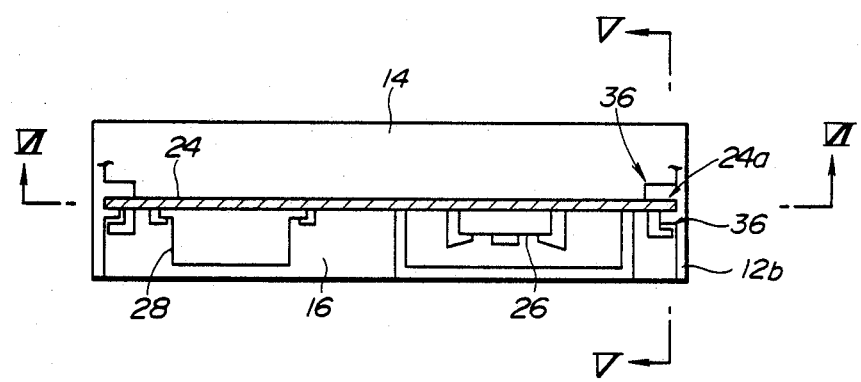
FIG. 2 is a rear elevation of the controller viewed from arrow A of FIG. 1.

As shown in FIG. 2, a pair of horizontally extending sliding rails 36 are formed on both of side walls 12b of the controller body 12. Each of the sliding rails 36 comprises two inwardly projecting portions and a channel formed therebetween. The side verge 24a of the supporting plate 24 is engageable with the channel of the sliding rail 36.

The side verges 24a of the supporting plate 24 are provided with a plurality of thrusting portions 38, each of which comprises a projection formed on one side of the side verge 24a and a recess formed in the opposite side thereof. The thickness of the side verge 24a at the thrusting portion 38 is less than that of other portions, so that the thrusting portion can be elastically depressed. When the verge 24a of the supporting plate 24 is inserted into the channel of the sliding rail 36, the thrusting portion 38 elastically engages the inner walls of the channels of the sliding rails 36 to prevent vertical vibration of the supporting plate 24 from occuring.

Each of the side verges 24a of the supporting plate 24 is also provided with an outwardly projecting portion 40 and an elongated opening 42 which is formed inside the projecting portion 40 so that the projecting portion 40 can be depressed inwardly. When the verge 24a of the supporting plate 24 is inserted into the channel of the sliding rail 36, the outwardly projecting portion 40 engages an opening 44 formed in the side wall 12b of the controller body 12 to prevent lateral vibration of the supporting plate 24 from occuring.

In addition, each of the side edges 24a of the supporting plate 24 is provided with a vertically extending anchor 46, the upper end of which extends outwardly so as to be essentially L-shaped in cross section. When the verge 24a of the supporting plate 24 is inserted into the channel of the sliding rail 36, the free end of the anchor 46 engages a latch 48 formed on the inner surface of the side wall 12b of the controller body 12 to prevent the supporting plate 24 from releasing from the sliding rail 36. A disengaging member 50 essentially L-shaped in cross section is formed on the outer surface of the side wall 12b of the controller body 12 at the position opposite the latch 48. When the disengaging member 50 is pulled, the latch 48 is moved outwardly to disengage from the free end of the anchor 46, so that the supporting plate 24 can be taken out of the controller body 12.

According to the present invention, another control unit 100 shown in FIG. 7 can be substituted for the control unit 16. The control unit 100 comprises a supporting plate 102, on which a variable resistor 104 for adjusting the temperature of conditioning air discharged from the discharge nozzles, a variable resistor 106 for adjusting voltage applied to the blower, and an amplifier 108 for amplifying signals inputted from the variable resistors 104 and 106 and for amplifying signals inputted from the push button switches 18, 20 and 22 via input terminals 110. A manually operable temperature setting lever 112 is connected to the variable resistor 104, and a manually operable blower switch lever 114 is connected to the variable resistor 106. By varying the resistance of the variable resistor 104 by means of the temperature setting lever 112, signals are transmitted from the amplifier 108 to an air-mix door actuator via output terminals 116, so that the opening angle of air-mix door can be controlled. By adjusting the resistance of the variable resistor 106 by means of the blower switch lever 114, the blower speed can be controlled so that the amount of conditioning air discharged from the discharge nozzles can be controlled.

Side verges having the same shape as that of the supporting plate 24 shown in FIG. 3 are formed on and extend outwardly from the side walls of the control unit 100. Specifically, the thrusting portion 38, the outwardly projecting portion 40, the elongated opening 42 and the anchor 46 are formed on the side verges of the control unit 100. Therefore, since the shape of the side verges of the control unit 100 is same as that of the supporting plate 24 shown in FIG. 3, the control unit 100 having the variable resistors can be substituted for the control unit 16.

What is claimed is:

1. A controller for an automotive air conditioner system comprising:
a controller body having a first engaging portion on the inner wall thereof; and
first and second control units housed in said controller body, said first and second control units cooperative for controlling the condition of air supplied to the vehicular cabin, said first control unit having a second engaging portion which engages said first engaging portion of said controller body to fix said first control unit to said inner wall of said controller body and which disengages from said first engaging portion of said controller body so as to allow said first control unit to be substituted for a third control unit having an engaging portion of the same shape as that of said second engaging portion, said third control unit being cooperative with said second control unit for controlling the condition of air supplied to the vehicular cabin.

2. A controller as set forth in claim 1, wherein said first engaging portion comprises a pair of horizontally extending and inwardly projecting parallel rails formed on the inner surface of the side wall of said controller body, and said second engaging portion is slidingly inserted into a channel formed between said rails to be supported on the rails.

3. A controller as set forth in claim 2, wherein said second engaging portion has a vertically projecting portion which abuts the inner wall of said channel to prevent the vertical vibrations of said first control unit.

4. A controller as set forth in claim 2, wherein said second engaging portion has an outwardly projecting portion and an elngated opening which is formed inside the projecting portion, said projecting portion engaging an opening formed in the side wall of said controller body to prevent lateral vibrations of said first control unit when said second engaging portion engages said channel.

5. A controller as set forth in claim 2, wherein said second engaging portion has a vertically extending anchor, the upper end of which extends outwardly and which is essentially L-shaped in cross section, so that the free end of said anchor engages a latch formed on the inner surface of said side wall of the controller body to prevent said first control unit from releasing from said rail of said controller body, said free end of said anchor being disengageable from said latch by pulling said latch in an outward direction.

6. A controller as set forth in claim 1, wherein said first control unit includes manually operable sliding switches, and said second control unit includes manually operable push button switches.

7. A controller as set forth in claim 6, wherein said sliding switches include a blower switch for changing the blower speed to adjust the amount of conditioning air discharged from discharge nozzles, and a temperature setting switch for controlling the opening angle of an air-mix door to adjust the temperature of conditioning air discharged from the discharge nozzles, and wherein said push button switches include a nozzle selecting switch for selecting conditioning air discharge nozzles, an intake door switch for adjusting an intake door and an air conditioner switch.

* * * * *